(12) United States Patent
Hall et al.

(10) Patent No.: US 7,558,921 B2
(45) Date of Patent: Jul. 7, 2009

(54) METHOD FOR DATA SET REPLACEMENT IN 4-WAY OR GREATER LOCKING CACHE

(75) Inventors: Ronald P. Hall, Cedar Park, TX (US); Gavin Balfour Meil, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/204,407

(22) Filed: Aug. 16, 2005

(65) Prior Publication Data

US 2007/0043906 A1    Feb. 22, 2007

(51) Int. Cl.
*G06F 12/00* (2006.01)
(52) U.S. Cl. .................. 711/133; 711/128; 711/136
(58) Field of Classification Search .......... 711/133, 711/136, 128
See application file for complete search history.

(56) References Cited

U.S. PATENT DOCUMENTS

| | | | |
|---|---|---|---|
| 5,594,886 A * | 1/1997 | Smith et al. ............... | 711/136 |
| 2003/0159003 A1* | 8/2003 | Gaskins et al. ............ | 711/128 |
| 2005/0055506 A1 | 3/2005 | DeMent et al. | |

* cited by examiner

*Primary Examiner*—Reginald G Bragdon
*Assistant Examiner*—Aracelis Ruiz
(74) *Attorney, Agent, or Firm*—Yee & Associates, P.C.; Matthew B. Talpis

(57) ABSTRACT

A method and means are provided for increasing both the MMBR (minimum misses before replaceable) and MHBR (minimum hits before replaceable) parameters for a virtual 3-way cache, consisting of three unlocked sets, from one to two. Thus, a minimum of two accesses to the sets B, C and D would be required, before a previously accessed set becomes the LRU. In one embodiment, a method is provided for selecting a data set for replacement in a locking cache that includes at least four data sets. Initially, a 4-way binary tree LRU associated with at least some of the sets of the locking cache is specified or configured, wherein the binary tree has a top level LRU bit, a first branch having one locked set and one unlocked set, and a second branch having two unlocked sets. The first and second branches are each provided with an LRU bit. The LRU bit of the first branch is set to a logic 1, when the unlocked set of the first branch is the MRU set of the three unlocked sets, to a logic 0, when such unlocked set is not the MRU or LRU set, and arbitrarily to either a logic 1 or 0, when such unlocked set is the LRU set.

20 Claims, 4 Drawing Sheets

METHOD FOR DATA SET REPLACEMENT IN 4-WAY OR GREATER LOCKING CACHE

BACKGROUND OF THE INVENTION

1. Field of the Invention

The invention disclosed and claimed herein generally pertains to a method associated with least recently used (LRU) logic for selecting a data set for replacement in a locking cache. More particularly, the invention pertains to a method of the above type wherein the cache may be a 4-way or a 4N-way locking cache, where N is an integer greater than 1. Even more particularly, the invention pertains to a method of the above type that provides the capability of a full 3-way (LRU) algorithm in selecting a data set for replacement, whereby the method keeps track of the strict order in which three sets have been accessed.

2. Description of the Related Art

As is generally well known in the art, caches are small, fast storage buffers employable to store information, such as instruction code or data, in order for a processing device to more quickly and efficiently have access to the information. Typically, it is faster for the processing device to read the smaller memory of the cache than to read a main memory. However, a cache is a limited resource. Accordingly, it has become common to employ LRU logic to select a data set in the cache for replacement, when space must be made in the cache to accommodate new data. The selected data set is then replaced with the new data. The LRU logic is generally used to keep track of the order in which respective data sets, or lines, within a cache congruence class are accessed. The LRU logic provides information indicating the least recently accessed set when a cache miss occurs, to indicate that new data must be entered. The cache is then operated to replace such least recently accessed set with the new data. This procedure is based on the assumption that the least recently accessed data set is also least likely to be needed in the future.

The term "cache congruence class", as used herein, refers to a group of data sets in a cache that are collectively represented by a particular LRU logic configuration. For each cache congruence class, there is LRU data stored either in the cache directory or in a separate array. A full LRU keeps track of the strict order in which all sets have been accessed. For example, in a 4-way set associative cache, that is, a cache congruence class having four data sets, a full LRU might encode the following order:

->Order of Use->LRU-> set D, set B, set C, set A <-MRU

This shows set D as being the least recently used and set A as being the most recently used (MRU). If set B were then accessed (due to a load or store), the LRU data would be updated to:

->Order of Use->LRU-> set D, set C, set A, set B <-MRU

If a cache miss then occurs, set D, being the least recently used, will be replaced. The LRU data will then be updated to:

->Order of Use->LRU-> set C, set A, set B, set D <-MRU

It is to be understood that for a full LRU procedure, after a given set (e.g., set D) becomes the MRU set, there must be at least three consecutive accesses to other sets (e.g., set A, B, and C) before set D becomes the LRU set and is subject to replacement. However, notwithstanding its advantages, a full LRU is expensive to implement. For example, at least five LRU bits are required to keep track of the least recently used set in a congruence class for a 4-way associative cache. Accordingly, a commonly used alternative is a binary tree LRU, which uses only N-1 bits, or three bits for a 4-way set associative cache. Each bit is located at a decision node of a binary tree whose leaves represent the N sets. The operation of a 4-way binary tree is described hereinafter in further detail.

In comparing the performance of full LRU and binary tree LRU algorithms, it is useful to consider the metrics MMBR (minimum misses before replaceable) and MHBR (minimum hits before replaceable). Following an access to any given set X, MMBR is the minimum number of consecutive misses which must occur before a subsequent miss will result in X being chosen for replacement. Following an access to any given set X, MHBR is the minimum number of consecutive hits to other sets which must occur before a subsequent miss will result in X being chosen for replacement. Each of these metrics provides a "worst case performance", that is, a measure of how quickly a data set, once accessed, can be forced out of the cache due to subsequent accesses.

As is further known in the art, a locking cache allows software (e.g., the operating system) to reserve certain sets of the cache for a particular application. When the given application is running, only those sets which are unlocked can be replaced by data needed by the application. Other sets cannot be replaced. This is useful for "pinning" an application in the cache, so that it is not forced out by accesses made by other applications. Also, the locking cache provides isolation for streaming applications, which load and then discard data.

In one example of a locking cache, a 4-way cache comprises sets A, B, C and D. Set A is reserved for a high-bandwidth streaming application called P, and sets B, C and D are reserved for all other applications, including an application Q. This creates a virtual 3-way cache for the majority of applications. However, as described hereinafter in further detail, under certain conditions, one of the sets B, C and D of the virtual 3-way cache would be replaced after only one access to another set. That is, both MMBR and MHBR for the virtual cache, indicating worst-case performance, would be only one. It would be very desirable to increase both the MMBR and MHBR for such 3-way cache arrangement, from one to at least two.

SUMMARY OF THE INVENTION

The invention generally provides a method and means whereby the MMBR and MHBR parameters for a virtual 3-way cache, consisting of three unlocked sets, are both increased from one to two. Thus, a minimum of two accesses to the sets B, C and D would be required, before a previously accessed set becomes the LRU. In the invention, it has been recognized that when one of the four sets of a 4-way cache is locked (and thus unavailable for replacement), the LRU bit that normally would control replacement of that set is being unused. Accordingly, this otherwise unused bit can be used to encode a full LRU for the three unlocked sets. One useful embodiment of the invention is directed to a method for selecting a data set for replacement in a locking cache that includes at least four data sets. The method includes the step of specifying a 4-way binary tree LRU associated with sets of the locking cache, the binary tree having a top level LRU bit, a first branch having one locked set and one unlocked set, and a second branch having two unlocked sets. The first and second branches are each provided with an LRU bit. The invention further includes setting the LRU bit of the first branch to a first logic value, when the one unlocked set of the first branch is the most recently used of the three unlocked sets, setting the LRU bit of the first branch to a second logic value, when the one unlocked set is neither the most recently used nor the least recently used of the three unlocked sets, and setting the LRU bit of the first branch arbitrarily to either the first or second logic value, when the first branch contains the least recently used of the three sets. The least recently used set is selected as the next set to be replaced in the locking cache.

DETAILED DESCRIPTION OF THE PREFERRED EMBODIMENT

Figure 1:
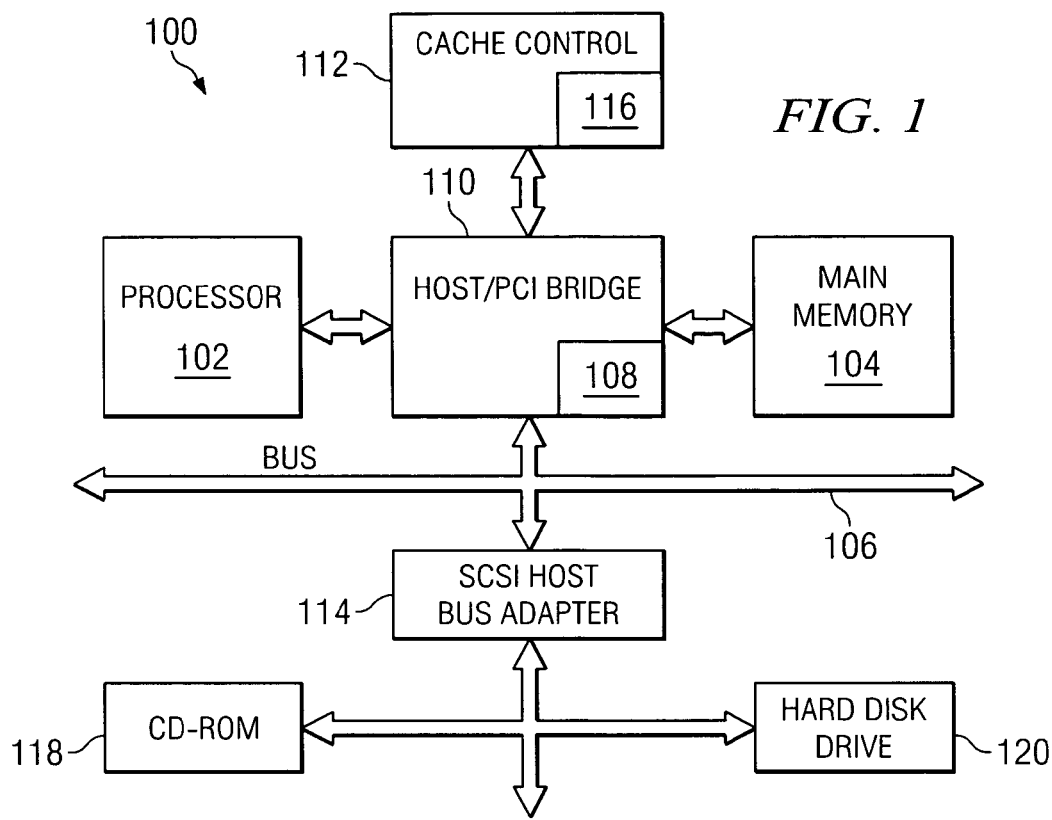
FIG. 1 is a block diagram showing a data processing system for use in implementing embodiments of the invention.

Referring to FIG. 1, there is shown a block diagram of a generalized data processing system 100 which may be used in implementing embodiments of the present invention. Data processing system 100 exemplifies a computer, in which code or instructions for implementing the processes of the present invention may be located. Data processing system 100 usefully employs a peripheral component interconnect (PCI) local bus architecture, although other bus architectures may alternatively be used. FIG. 1 shows a processor 102 and main memory 104 connected to a PCI local bus 106 through a Host/PCI bridge 110. PCI bridge 110 also includes a cache memory 108 for processor 102. This cache memory 108 may, for example, contain respective data sets to be processed in accordance with embodiments of the invention, as described herein.

Referring further to FIG. 1, there is shown a cache control 112 connected to operate cache 108. Cache control 112 may be located apart from cache 108, as shown in FIG. 1, or may alternatively be formed as an integral component with cache 108. Cache control 112 includes a hardware logic block 116, described hereinafter in connection with FIG. 5.

FIG. 1 further shows a small computer system interface (SCSI) host bus adapter 114 connected to PCI local bus 106 by direct component connection. SCSI host bus adapter 114 provides a connection for hard disk drive 120, and also for CD-ROM drive 118. An operating system runs on processor 102 and is used to coordinate and provide control of various components within data processing system 100 shown in FIG. 1. The operating system may be a commercially available operating system such as Windows XP, which is available from Microsoft Corporation. Instructions for the operating system and for applications or programs are located on storage devices, such as hard disk drive 120, and may be loaded into main memory 104 for execution by processor 102.

The system of FIG. 1 could, of course, be more specifically adapted to perform tasks or functions of many different types. Examples of such more specific systems could include gaming systems, highly intensive graphics systems, medical imaging systems, systems for oil field exploration and systems for numerical processing, such as for accounting and banking. However, the scope of the invention is by no means limited thereto.

As indicated above, operation of a 4-way binary tree LRU is closely related to embodiments of the invention. Accordingly, a binary tree for a 4-way cache, comprising data sets A, B, C and D is shown below to illustrate characteristics thereof:

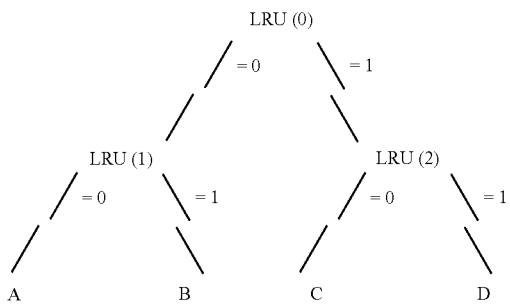

Each LRU bit, or decision node, indicates the least recently used subtree. For example, if LRU(0) is logic 0, it points to the left subnode, LRU(1). If LRU(1) is logic 1, it points to the right leaf, which is set B. This is usefully illustrated by using double lines to show which way each LRU bit is pointing:

LRU = 010 :

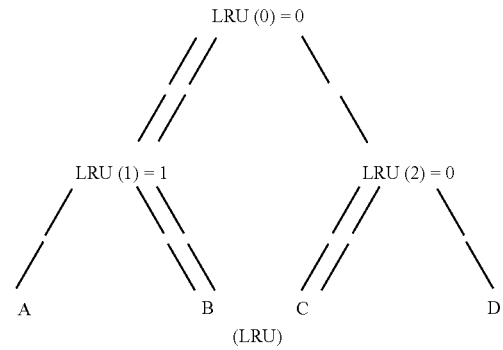

Thus, when the LRU bits equal 010, set B is the LRU set. When there is a cache miss, the tree is traversed from the root to the leaves, following the path pointed to by each node to get to the LRU set, which is the set that will be replaced.

It is to be understood that in the above illustration, the LRU value "010" is a concise way to represent all of the LRU bits collectively. More particularly, "LRU=010" indicates that the bit LRU(0)=0, LRU(1)=1 and LRU(2)=0. In the general case, whenever a string of three digits is used herein to represent LRU value, the left-most digit of the string is the value of LRU(0), the center digit is the value of LRU(1), and the right-most digit is the value of LRU(2).

Whenever a set within a congruence class is accessed, either due to a cache hit or after being replaced due to a cache miss, the LRU bits in the ancestor nodes of the accessed set are updated to point away from the accessed set. Thus, if the LRU bits are initially 010, as shown above, and then set B is accessed, LRU(0) will be updated to 1, and LRU(1) will be updated to 0:

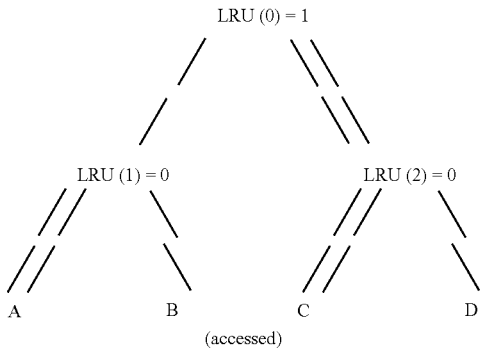

It will be noted that LRU(2) is unaffected, since it is not an ancestor of set B in the tree. Set C is now the LRU set, as shown by the double lines pointing thereto.

Figure 2A:
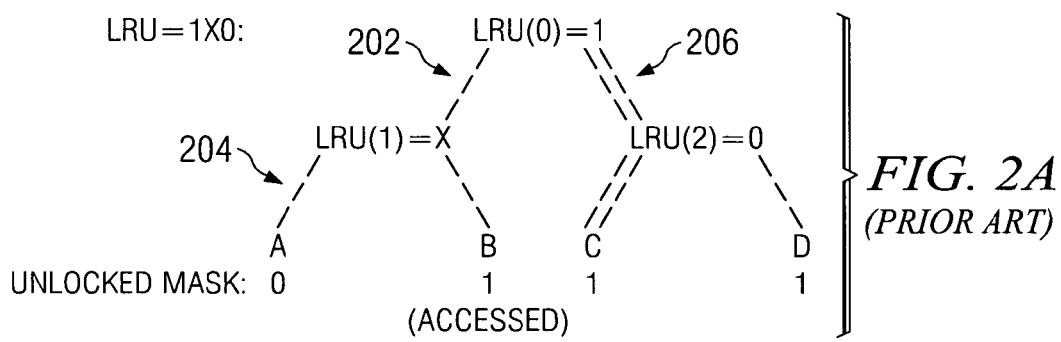
FIGS. 2A-B are binary tree diagrams that collectively illustrate a problem of the prior art that is addressed by embodiments of the invention.

Referring to FIG. 2A, there is shown a 4-way binary tree 202 pertaining to a cache, such as cache 108, wherein a set A is reserved for a high-bandwidth streaming application P, and sets B, C and D are reserved for all other applications, including an application Q. This may be achieved by cache locking, as described above. FIG. 2A further shows binary tree 202 provided with branches 204 and 206, and with a top level decision node, or LRU bit, LRU(0). LRU(0) indicates the branch containing the set which is to be replaced next. Branches 204 and 206 are provided with LRU decision bits LRU(1) and LRU(2), respectively.

Cache locking is usefully implemented by supplying an unlocked mask, which may be an entry of a replacement management table as described hereinafter. In the arrangement of FIG. 2A, the unlocked mask would be "1000" when application P accesses the cache (not shown in FIG. 2A). Thus, only set A would be unlocked, and only set A could be replaced in the event of a miss. In this mode of operation both decision bits LRU(0) and LRU(1) would be overridden, so that access by the streaming application P would not be affected by or have any effect on LRU(0) and LRU(1). The term "overridden" can be more clearly understood by referring to U.S. Patent Application Publication No. US-2005/0055506, published Mar. 10, 2005.

Referring further to FIG. 2A, when an application such as Q accesses the cache, the unlocked mask is "0111" (as actually shown by FIG. 2A) and set A is locked thereby. In accordance with conventional practice, and as further shown by FIG. 2A, when application Q or other application besides P accesses the cache, LRU(1) is overridden, and thus neither affects nor is affected by such access. Accordingly, LRU(1) is represented by the value "X" in FIG. 2A, to indicate that it does not matter whether LRU(1) is a logic 1 or a logic 0. It is further assumed that the binary tree shown by FIG. 2A results from the application Q having just previously accessed set B. This action sets LRU(0) to 1, and results in set C becoming the least recently used set, as indicated by the double lines in FIG. 2A.

Figure 2B:
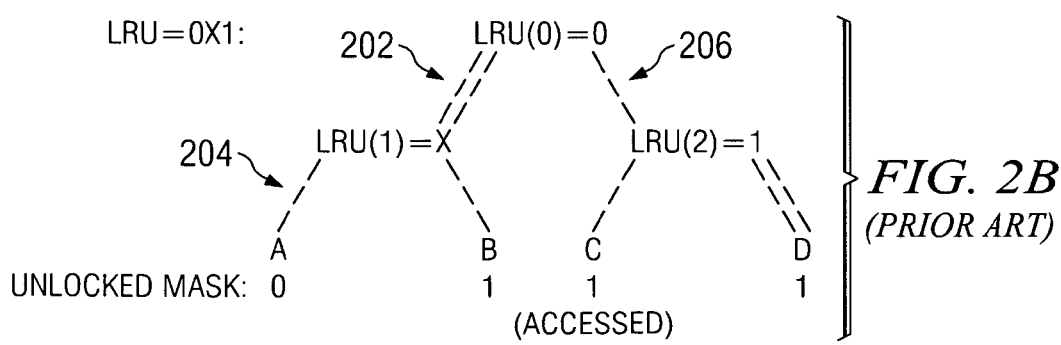

Referring to FIG. 2B, there is shown binary tree 202, again in accordance with conventional practice, following either a hit to set C, or a cache miss, whereupon set C is replaced. As stated above, set C was the least recently used set, of the unlocked sets B, C and D, just before the hit or miss. The binary tree of FIG. 2B shows that set B has now become the effective LRU set and will be replaced next, since LRU(0) points to branch 204, and LRU(1) is overridden because set A is locked. However, there was only one access to another set (set C) since the previous access to set B. Accordingly, the worst-case performance for the virtual 3-way cache consisting of sets B, C and D, as shown by FIGS. 2A and 2B, is MMBR=MHBR=one.

In order to improve performance of the above virtual 3-way cache configuration, it has been recognized that a mapping between the eight possible values of the bits LRU(0), LRU(1) and LRU(2), and the six permutations of order-of-use of sets B, C and D, could provide the benefit of a full 3-way LRU. Moreover, the encoding derived from such mapping can be achieved so that there is no change in meaning to LRU(0) and LRU(2), the two LRU bits that are not overridden by the unlocked mask 0111. Accordingly, embodiments of the invention would not change a conventional algorithm that has been used previously to select the data set to be replaced. These objectives are accomplished by applying the following rules to the LRU bit that is unused in a locking cache (e.g., LRU(1) in FIGS. 2A-B), for an unlocked mask of 0111:

(1) The previously unused LRU bit is set to logic 1, if the one unlocked set below such bit is the most recently used (MRU) among the three unlocked sets.
(2) The previously unused LRU bit can arbitrarily be set to either logic 1 or logic 0, when the branch containing this bit is the least recently used branch, i.e., LRU(0) points to such branch.
(3) The previously used LRU bit is set to logic 0, if neither Rule (1) nor Rule (2) applies.

Figure 3A:
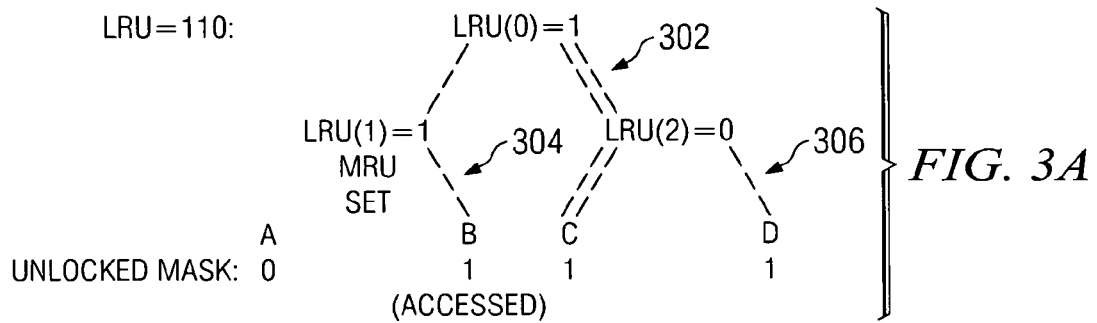
FIGS. 3A-C are binary tree diagrams that collectively illustrate an embodiment of the invention.

Referring to FIG. 3A, there is shown a 4-way binary tree 302, that is very similar to binary tree 202 shown in FIG. 2A and has branches 304 and 306. Thus, an unlocked mask 0111 is applied, and the configuration shown in FIG. 3A has resulted from an access to set B by application Q. LRU(0) is again set to logic 1, and it is assumed that LRU(2)=0. However, since set B is now the MRU set, LRU(1) must be set to logic 1, in accordance with the above Rule (1).

Figure 3B:
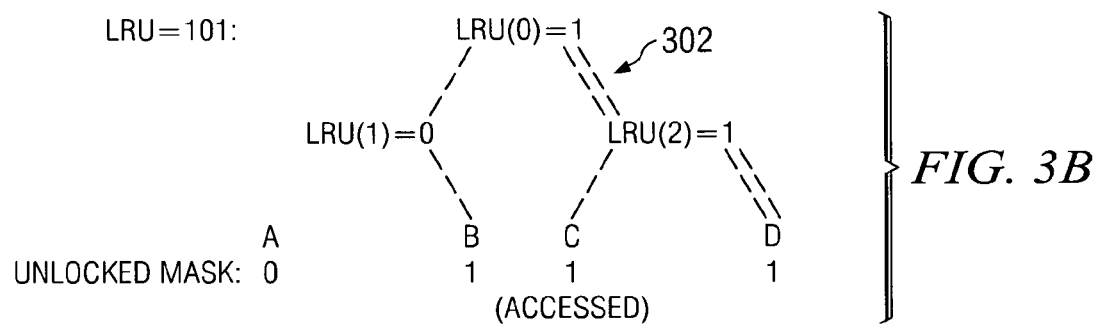

Referring to FIG. 3B, it is assumed that the configuration of FIG. 3A is immediately followed by either a hit to set C, or by a miss, whereupon the LRU set C is replaced. LRU(2) is thereby changed from logic 0 to logic 1, as shown by FIG. 3B, to indicate that set D has now become the least recently used set, of the three unlocked sets B, C and D. Set B is now neither the most recently used nor the least recently used set. Thus, FIG. 3B shows LRU(1) set to logic 0, in accordance with the above Rule (3). LRU(0) remains set to logic 1 to indicate that the LRU set (set D) is in the right branch of the tree.

Figure 3C:
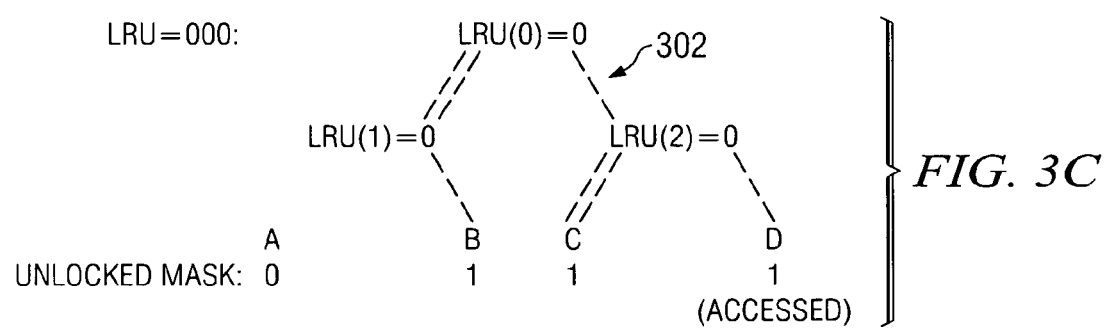

FIG. 3B indicates that LRU set D will be replaced in the event of a miss, before set B is replaced. Thus, the only way for set B to again become the LRU set is to access set D. As shown by FIG. 3C, access of D results in LRU(0) going from logic 1 to logic 0, to indicate that set B has become the LRU set. The decision node LRU(2) changes from logic 1 to logic 0, thus now pointing to set C. In accordance with Rule (2), LRU(1) may be either logic 1 or logic 0, since set B is now the LRU set. FIG. 3C shows LRU(1) arbitrarily remaining at logic 0.

It is seen from the above that after the first access to set B, which provides the configuration shown in FIG. 3A, successive access to two other sets, i.e. set C and then set D, are required to again make set B the LRU set. Thus, by implementing an embodiment of the invention, the worst-case performance for the virtual 3-way cache consisting of sets B, C and D is MMBR=MMBR=2, instead of 1. Thus, the invention provides a significant improvement over the prior art. Following an access to any of the three sets, both other sets must be accessed before the first set becomes subject to replacement.

The invention can take the form of an entirely hardware embodiment, an entirely software embodiment, or an embodiment containing both hardware and software elements. In a preferred embodiment, the invention is implemented in hardware, as part of a data processing system, and even more particularly as part of a cache set access system, and more particularly as part of the logic which updates the LRU bits stored for the cache set access system.

Figure 4:
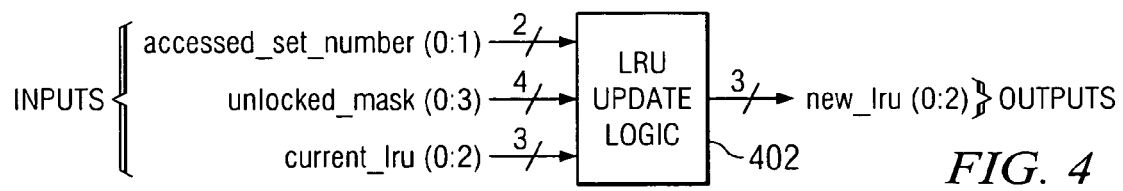
FIG. 4 is a block diagram showing a hardware logic block provided to generate updated values of LRU bits for a locking cache system, in accordance with an embodiment of the invention.

Referring to FIG. 4, there is shown a block diagram of a logic block or logic circuit 402, identical to logic block 116, whose function is to determine the new value of the LRU bits associated with one congruence class of a four-way set associative locking cache. The logic block has three input signals and one output signal. One input is accessed_set_number, consisting of two bits, and indicating which set was accessed by a hit or replaced due to a miss (e.g., 00=A, 01=B, 10=C and 11=D). The input unlocked_mask contains one bit per set, wherein a 0 means the corresponding set is locked, or unreplaceable by the application causing the current access, and a 1 means the corresponding set is unlocked, or replaceable by the application causing the current access. The third input, current_lru, which consists of three bits, is the state of the LRU bits for the accessed congruence class prior to this access. The output new_lru is the new value that the LRU bits should assume following the access.

It is to be noted that the logic block shown in FIG. 4 will produce a value of new_lru given any combination of values on the inputs. It is further noted that this invention in particular addresses the case in which the unlocked_mask input contains exactly three (of four) bits set to one. In particular it should be noted that whenever unlocked_mask has a single bit set to 1, the logic block produces no change in LRU bits (i.e., new_lru=current_lru), which, in the context of the current invention, will preserve the meaning of the LRU bits as encoding the full LRU of the other three sets.

Figure 5:
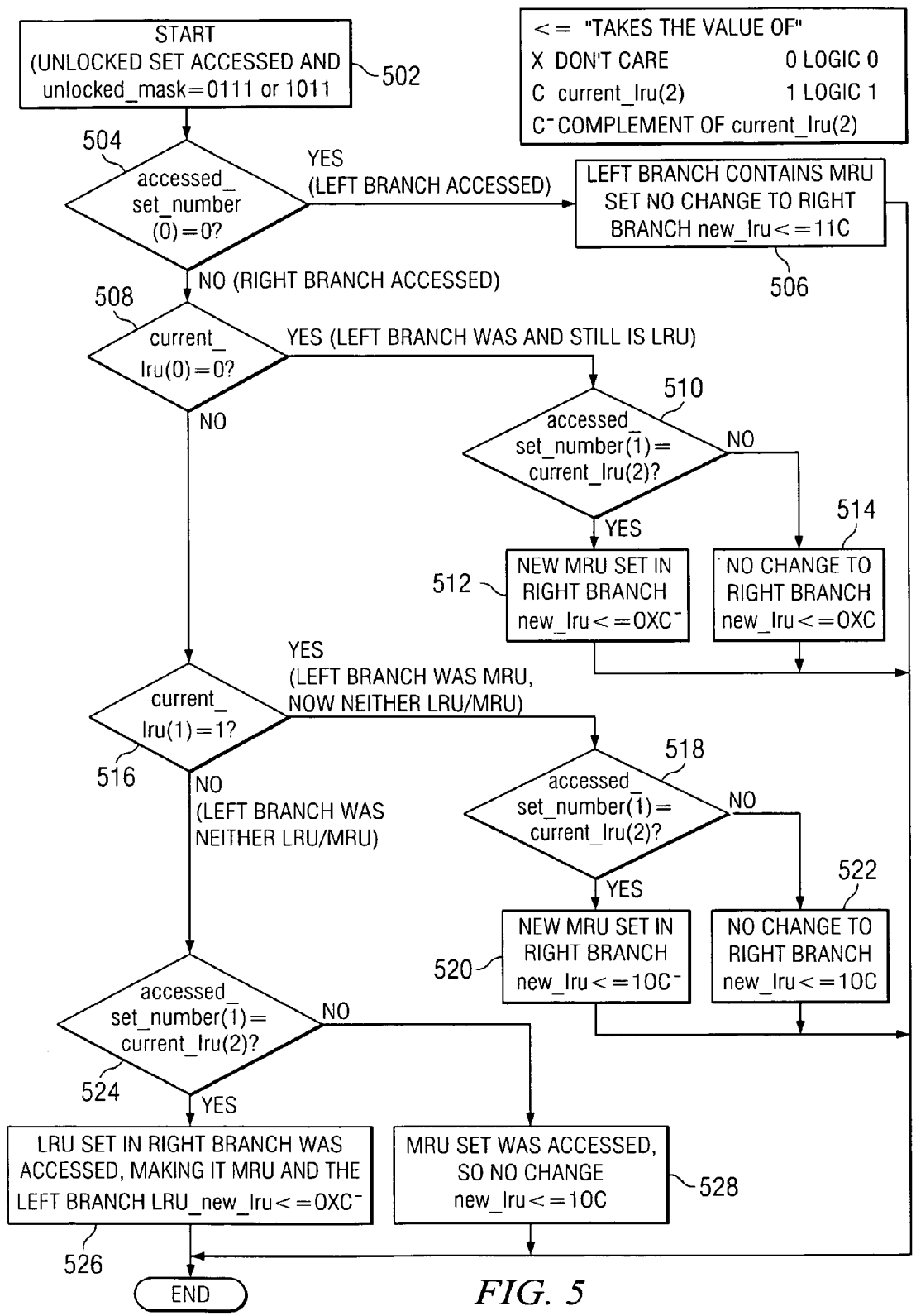
FIG. 5 is a flow chart further illustrating steps of the embodiment of FIGS. 3A-C.

Referring to FIG. 5, there is shown a flow chart illustrating steps of the above procedure, as applied to 4-way binary tree LRU 302 shown in FIGS. 3A-C, comprising one locked set A and three unlocked sets B, C and D, or as applied to a similar binary tree LRU comprising one locked set B and three unlocked sets A, C and D. Accordingly, as indicated by start block 502, the input unlocked_mask would be 0111 or 1011. This means that there are two unlocked sets in the right branch 306 and one unlocked set in the left branch 304. A full LRU using the three LRU bits is implemented for this arrangement as follows:

(1) LRU bit(0) has the conventional meaning set forth above:
   0=the LRU set is in the left branch
   1=the LRU set is in the right branch
(2) LRU bit(2) has the conventional meaning set forth above in regard to the two sets in the right branch:
   0=the left set is less recently used than the right set
   1=the right set is less recently used than the left set
(3) LRU bit(1) has special meanings as set forth above:
   0=the unlocked set in the left branch is neither the LRU nor the MRU set
   1=the unlocked set in the left branch is the MRU set
   When the unlocked set in the left branch is the LRU set, this bit is arbitrary or "don't care"

Referring further to FIG. 5, there is shown decision block 504 indicating that a first step is to determine whether accessed_set_number(0)=0. If this determination is positive, then the left branch is accessed, as indicated by function block 506. The left branch now contains the MRU set. The output new_lru takes the value of 11C. Since the set in the left branch is the MRU set, the relationship of right branch sets does not change. As stated above, in a 3-digit string used herein to represent an LRU value, the left, center and right digits indicate the LRU(0), LRU(1) and LRU(2) bits, respectively. Thus, for the new_lru value shown in function block 506, the LRU(0) bit is logic 1, the LRU(1) bit is logic 1, and the LRU(2) bit is C. The Legend shown in FIG. 5 indicates that C is the current_lru(2).

FIG. 5 further shows that if the determination of decision block 504 is negative, the right branch 306 is accessed. In this event, decision block 508 shows that it is necessary to determine whether current_lru(0)=0. If it does, then the left branch 304 of the binary tree did and still does contain the LRU set. Decision block 510 indicates that it then is necessary to determine if accessed_set_number(1)=current_lru(2). If it does, there is a new MRU set in the right branch 306 and new_lru takes the value of 0XC⁻, as shown by function box 512. If it does not, there is no change to the right branch, as shown by function block 514, and new_lru takes the value of 0XC. (From the Legend of FIG. 5, it is seen that X represents a "don't care", and C⁻ is the complement of current_lru(2).)

If decision block 508 provides a negative output, it must be determined whether current_lru(1)=1, as shown by decision block 516. If the output of decision block 516 is positive, the left branch 304 had contained the MRU set, and now contains neither the MRU nor the LRU set. Moreover, decision block 518 indicates that it becomes necessary to determine whether accessed_set_number(1)=current_lru(2). If it does, function block 520 shows that the right branch now contains the MRU set, and new_lru takes the value of 10C⁻. If it does not, function block 522 indicates that there is no change to the right branch, and new_lru takes the value of 10C.

Referring further to FIG. 5, if the output of decision block 516 is negative, the left branch 304 contained neither the LRU nor the MRU set. This implies that the previous LRU and MRU sets were both in right branch 306. As shown by decision block 524 and function block 526, if accessed_set_number(1)=current_lru(2), then the LRU set in the right branch was accessed, making it the new MRU set. The previous MRU set thus becomes neither the LRU nor the MRU set, and the unlocked set in the left branch 304 becomes the LRU set. New_lru takes the value of 0XC⁻.

If the determination of decision block 524 is negative, this indicates the MRU set was accessed, so that there is no change as shown by function block 528. The new_lru takes the value of 10C.

It is to be noted that the algorithm of FIG. 5 assumes that one of the unlocked sets was accessed. In the case of an access (i.e., a cache hit) to a locked set, there is never a change to the LRU bits for that congruence class. It is also to be noted that for the sake of brevity the flow chart of FIG. 5 specifies the algorithm for determining the new_lru output value for only two values-0111 and 1011-out of four possible values of unlocked_mask having exactly three bits set to one. It is anticipated that one skilled in the art could derive from this flow chart the algorithm for determining the new_lru output value for the other two values, 1101 and 1110, which is similar. As previously noted, the logic block illustrated in FIG. 4 would implement both of these algorithms as well as algorithms for all other possible input values. It is also to be noted that an algorithm such as that of FIG. 5 can be represented in a hardware description language such as Verilog or VHDL, and that methods exist to translate, or "synthesize" such representations into a schematic of interconnected logic gates (AND gates, OR gates, inverters, etc.) which can be implemented in hardware. Finally, it is to be noted that the logic contained in the logic block represented by FIG. 4 would typically be connected to surrounding logic within a cache set access system; and the outputs of the logic block would be sampled and utilized by the surrounding logic whenever the associated cache was accessed. The new_lru value produced by this logic block would at such times be written to the appropriate storage elements (e.g., storage latches or memory cells) containing the LRU bits for the accessed congruence class.

Figure 6:
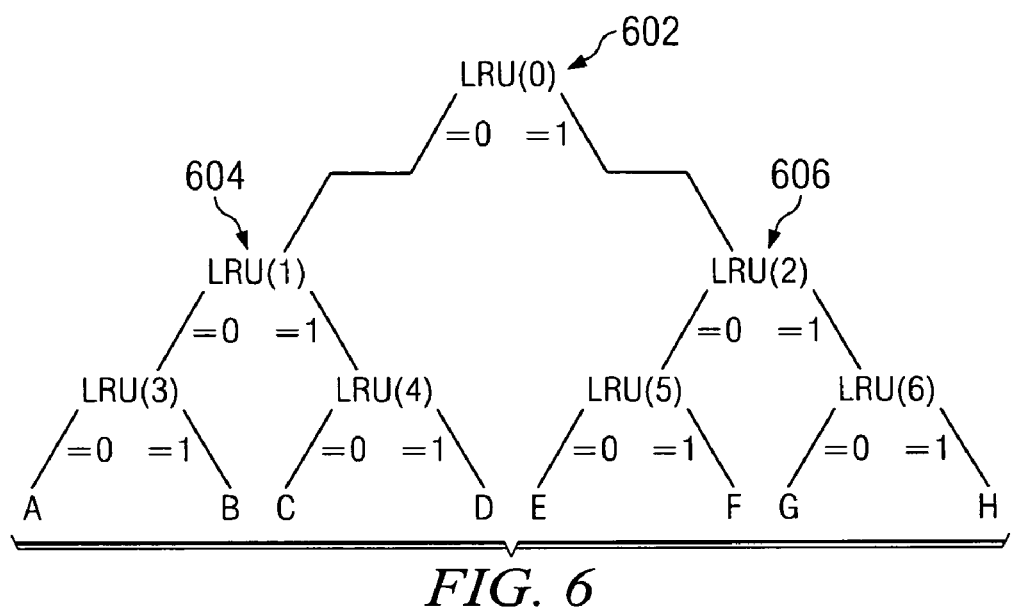
FIG. 6 shows an 8-way binary tree pertaining to a further embodiment of the invention.

Referring to FIG. 6, there is shown an 8-way binary tree LRU 602 that uses seven LRU bits per congruence class. The bit LRU(0) points to the least recently accessed 4-way sub-tree 604 or 606, which collectively compose binary tree 602. LRU(1), LRU(3) and LRU(4) function exactly as the respectively corresponding LRU bits in 4-way binary tree 302, described above for sets A-D. Similarly, LRU(2), LRU(5) and LRU(6) function exactly as the respective corresponding LRU bits in binary tree 302 for sets E-H. The logic specified by the invention, as described above in connection with FIGS. 3A-C, can be replicated to apply to a full 3-way LRU algorithm constructed in accordance with the invention, to either of the 4-way sub-trees 604 or 606. On any given access, only the logic for the accessed sub-tree would be activated. The LRU bits for the other sub-tree would not change. As described in the prior art such as Pat. Publ. No. US-2005/0055507, referred to above, the top-level LRU bit, LRU(0), is updated only if there are one or more unlocked sets in both of the two 4-way sub-trees; and in this case it is updated to point away from the accessed sub-tree.

In the case of an 8-way binary tree LRU, as illustrated in FIG. 6, for use with an 8-way set associative cache, the unlocked mask representing an entry of a Replacement Management Table (RMT) will consist of eight bits, and thus may indicate more than 4 unlocked sets (more than 4 bits set to one).

In the specific case of an unlocked mask containing 7 bits set to one (indicating 7 unlocked sets), it can be demonstrated in a manner similar to the previous discussion of the three-unlocked-set case that the MMBR and MHBR metrics for the resulting virtual 7-way set associative cache would be 3 and 2, respectively, utilizing the prior art; and would be 5 and 3, respectively, if utilizing the invention as described above. Thus, the invention provides a significant benefit to the 7-way case.

In the specific case of an unlocked mask equal to 01111110 (or any case in which there are 3 unlocked sets in each sub-tree) it can be demonstrated the MMBR and MHBR metrics for the virtual 6-way associative cache created by any of these masks would be 3 and 2, respectively, utilizing the prior art; and would be 5 and 3, respectively, utilizing the invention as described above, and assuming that software sets no other RMT entry to contain unlocked sets in both subtrees (i.e., unlocked sets among sets A-D and unlocked sets among sets E-H). Thus, the invention provides a significant benefit to these 6-way cases.

In the case of an unlocked mask specifying six unlocked sets, four of which are in one subtree and two in the other, as in the cases, for example, of the masks 00111111 and 11111100, it can be demonstrated that the MMBR and MHBR metrics would be 3 and 2, respectively, utilizing the prior art. The invention can be extended to provide benefit for this case, specifically, to increase the MMBR metric from 3 to 4, by applying the following rules for updating LRU(0): If all of sets A-D and two of the sets E-H are unlocked, LRU(0) should be set to logic 1 if set C or D is accessed, and set to logic 0 if any other unlocked set is accessed. If two of the sets A-D and all of the sets E-H are unlocked, LRU(0) should be set to logic 0 if set G or H is accessed, and set to logic 1 if any other unlocked set is accessed.

Figure 7:
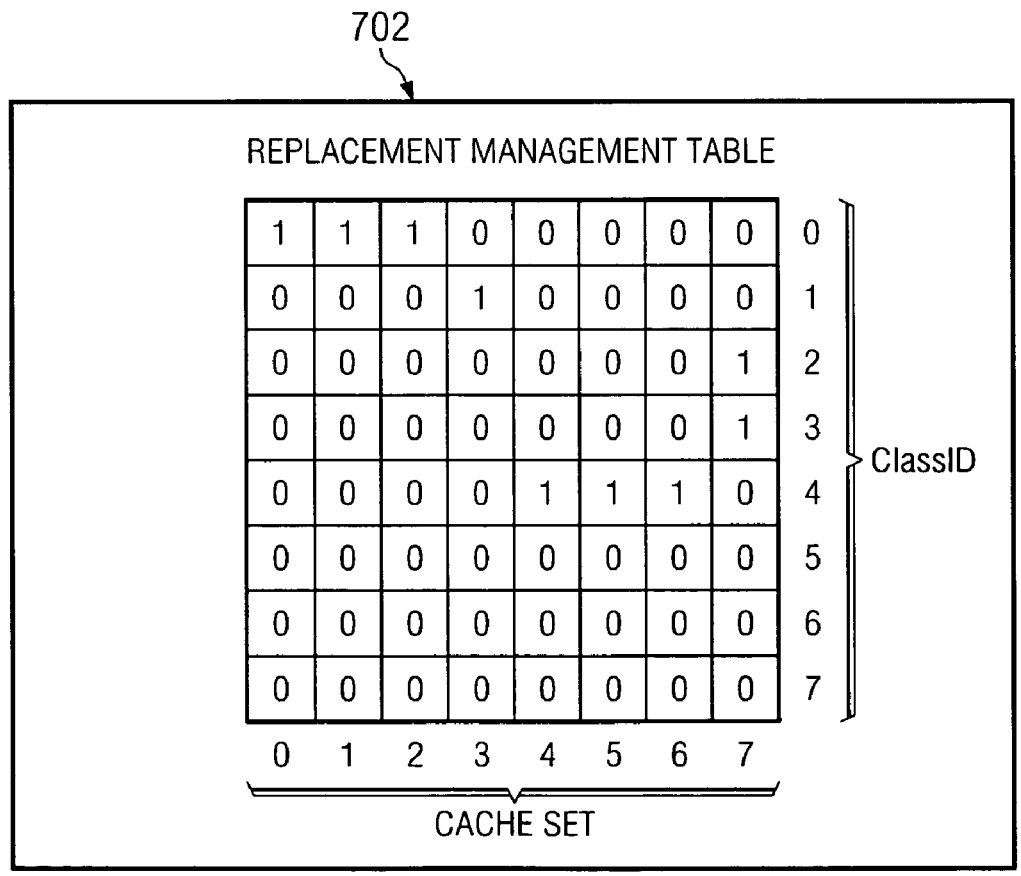
FIG. 7 is a schematic diagram showing a replacement management table for use in connection with embodiments of the invention.

Referring to FIG. 7, there is shown a replacement management table (RMT) 702 for use in locking and unlocking respective sets in cache 108. The table 702 comprises a matrix of class ID's, generated by registers of data processing system 100 that are classed with defined sets of cache 108. Generally, the table 702 illustrates decisions made by software of the operating system of the system 100 as to the replacement management status of the sets within cache 108, as they correlate to a given class ID. Replacement management tables such as RMT 702 are described in further detail, such as in U.S. Patent Application Publication No. US-2005/0055506, published Mar. 10, 2005.

The invention can also take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In connection with a locking cache that includes at least four data sets, a method for updating LRU bits following access to the cache, said method comprising the steps of:
   specifying a 4-way binary tree LRU associated with at least some of the sets of said locking cache, said binary tree having a top level LRU bit, a first branch having one locked set and one unlocked set, and a second branch having two unlocked sets, said first and second branches each having an LRU bit;
   establishing a mapping from eight possible values that can be encoded using said LRU bits, to six possible order-of-use permutations for said unlocked sets; and
   updating said LRU bits, following a particular cache access, in accordance with rules provided by said mapping.

2. The method of claim 1, further including the steps of:
   setting said LRU bit of said first branch to a first logic value, when said unlocked set of said first branch is the most recently used of said three unlocked sets;
   setting said LRU bit of said first branch to a second logic value, when said unlocked set of said first branch is neither the most recently used nor the least recently used of said three unlocked sets; and
   setting said LRU bit of said first branch arbitrarily to either said first or second logic value, when said first branch contains the least recently used of said sets.

3. The method of claim 2, wherein:
   said top level LRU bit is set based on which of a plurality of sub-trees contains the least recently used set, and the LRU bit for the second branch is set based on which of the two sets in the second branch is less recently used.

4. The method of claim 3, wherein:
   said method is carried out in accordance with a full 3-way LRU procedure.

5. The method of claim 2, wherein:
one of said logic values comprises a logic 1, and the other of said logic values comprises a logic 0.

6. The method of claim 2, wherein:
sets of said cache are respectively locked or unlocked by means of a replacement management table.

7. The method of claim 2, wherein:
said method is carried out by implementing a full 3-way LRU algorithm having inputs respectively comprising an accessed set number, an unlocked mask and a current value of said LRU bits, and an output comprising a new value to be taken by said LRU bits.

8. The method of claim 1, wherein:
said LRU bits are updated by means of a logic circuit comprising a configuration of logic gates.

9. The method of claim 1, wherein:
said locking cache is a 4N-way locking cache having an associated 4N-way binary tree LRU, wherein N is an integer greater than 1, said 4N-way binary tree LRU comprising N 4-way sub-trees, each associated with four sets.

10. The method of claim 9, wherein:
said binary tree is an 8-way binary tree, and if all the sets of a first one of said 4-way sub-trees and two of the sets of the other 4-way sub-tree are respectively unlocked, a top level LRU bit of said 8-way binary tree is set to a first logic value, indicating a second of said 4-way sub-trees contains the least recently used set, if one of two pre-specified sets of said first sub-tree is accessed; and said top-level LRU bit of said 8-way binary tree is set to a second logic value if any unlocked set other than said pre-specified sets is accessed.

11. The method of claim 1, wherein:
said data sets are respectively included in a cache congruence class contained in said cache.

12. The method of claim 1, wherein:
said locked set is reserved for a streaming application.

13. The method of claim 1, wherein:
said method further includes the step of selecting the least recently used set of said three unlocked sets for replacement in said locking cache.

14. A computer program product, comprising:
a computer readable storage medium storing computer usable program code for selecting a data set for replacement in a locking cache that includes at least four data sets, said computer program code comprising:
first instructions for specifying a 4-way binary tree LRU associated with at least some of the sets of said locking cache, said binary tree having a top level LRU bit, a first branch having one locked set and one unlocked set, and a second branch having two unlocked sets, said first and second branches each having an LRU bit;
second instructions for setting said LRU bit of said first branch to a first logic value, when said unlocked set of said first branch is the most recently used of said three unlocked sets;
third instructions for setting said LRU bit of said first branch to a second logic value, when said unlocked set of said first branch is neither the most recently used nor the least recently used of said three unlocked sets;
fourth instructions for setting said LRU bit of said first branch arbitrarily to either said first or second logic value, when said first branch contains the least recently used of said sets; and
fifth instructions for selecting the least recently used set of said three unlocked sets for replacement in said locking cache.

15. The computer program product of claim 14, wherein:
said selection of said least recently used set is carried out in accordance with a full 3-way LRU procedure.

16. In a data processing system, apparatus comprising:
a cache that includes at least four data sets;
a locking component, connected to said cache, configuring a 4-way binary tree LRU associated with at least some of the sets of said cache, said binary tree having a top level LRU bit, a first branch having one locked set and one unlocked set, and a second branch having two unlocked sets, said first and second branches each having an LRU bit;
a processor device setting said LRU bit of said first branch to a first logic value, when said one unlocked set is the most recently used of said three unlocked sets, to a second logic value, when said one unlocked set is neither the most nor the least recently used of said sets, and to either said first or second logic value, arbitrarily, when said first branch contains the least recently used of said sets; and
said processor device being further selecting the least recently used set of said three unlocked sets, and to then replace said selected set in said cache.

17. The apparatus of claim 16, wherein:
said selection of said least recently used set is carried out in accordance with a full 3-way LRU procedure.

18. The apparatus of claim 17, wherein:
said cache is a 4N-way locking cache having an associated 4N-way binary tree LRU, wherein N is an integer greater than 1, said 4N-way binary tree LRU comprising N 4-way sub-trees, each associated with four sets.

19. The apparatus of claim 17, wherein:
said locked set is reserved for a streaming application.

20. The apparatus of claim 17, wherein:
said locking component comprises a replacement management table.

* * * * *